Nov. 13, 1956    D. F. PRZYBYLSKI    2,770,379
BOOM AND BOOM-OPERATING MEANS FOR DIPPER STICK
Filed Oct. 25, 1951    6 Sheets-Sheet 1

INVENTOR.
DANIEL F. PRZYBYLSKI
BY Harry D. Kilgore
ATTORNEY

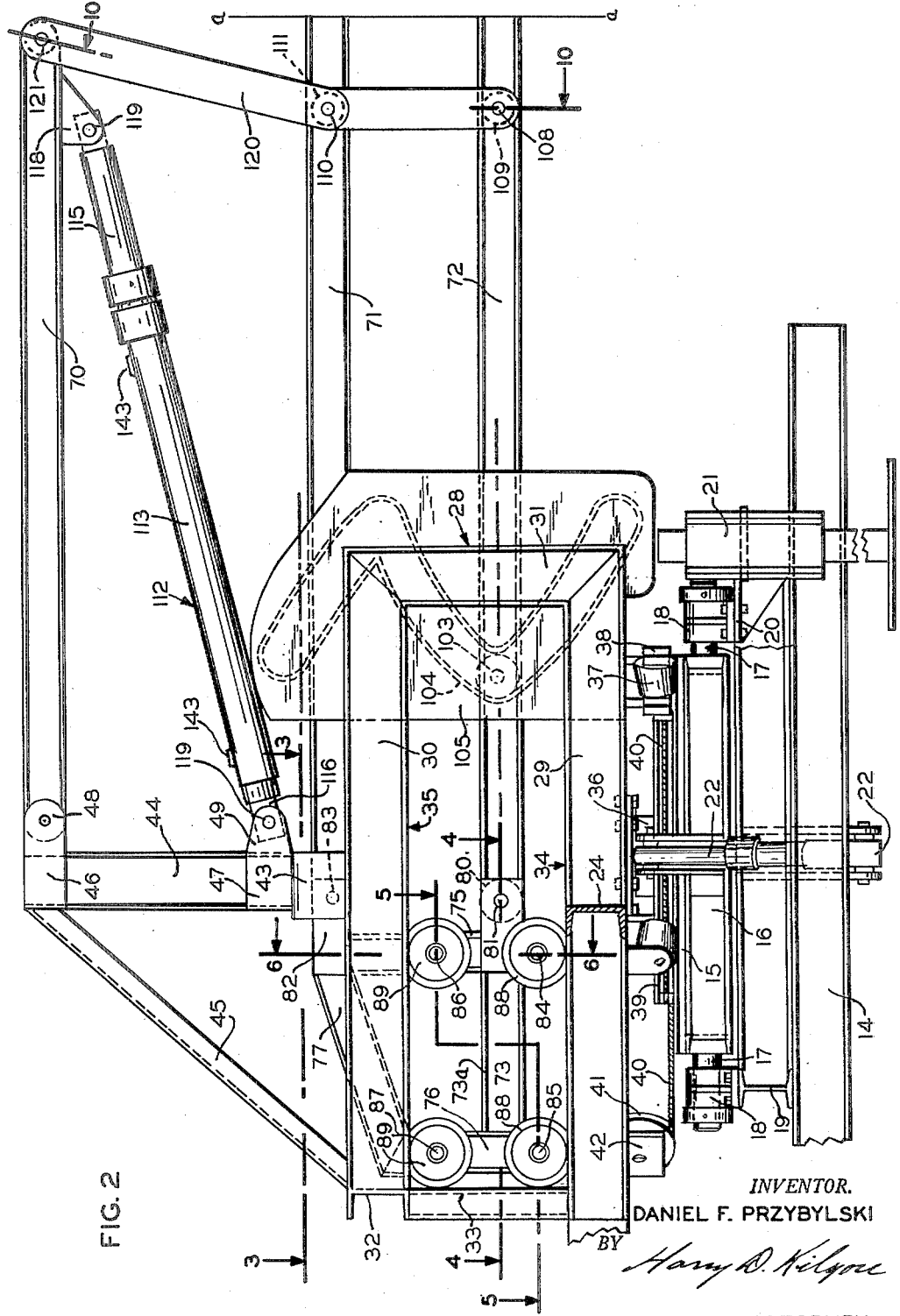

Nov. 13, 1956  D. F. PRZYBYLSKI  2,770,379
BOOM AND BOOM-OPERATING MEANS FOR DIPPER STICK
Filed Oct. 25, 1951  6 Sheets-Sheet 3
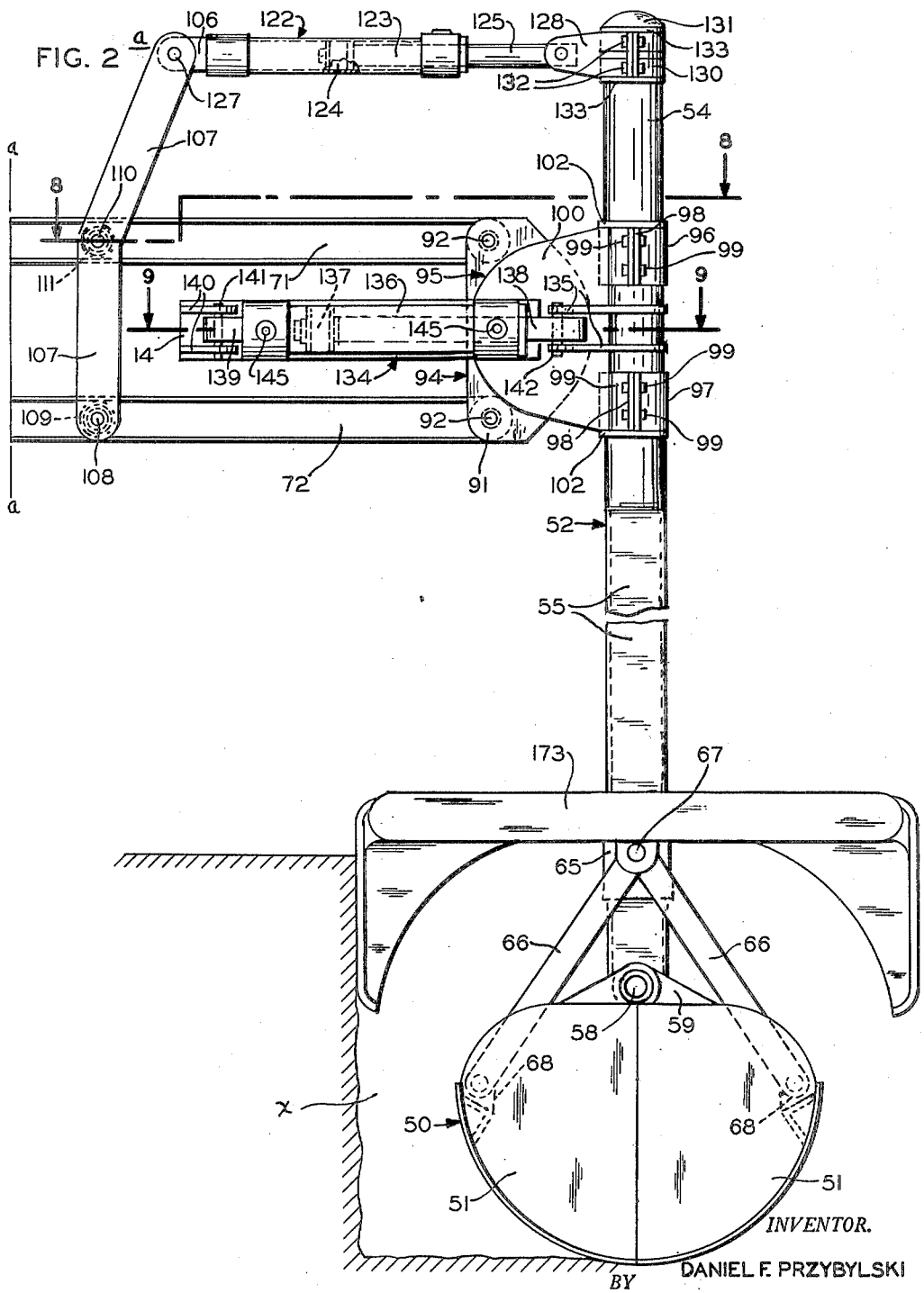
INVENTOR.
DANIEL F. PRZYBYLSKI
BY *Harry O. Kilgore*
ATTORNEY

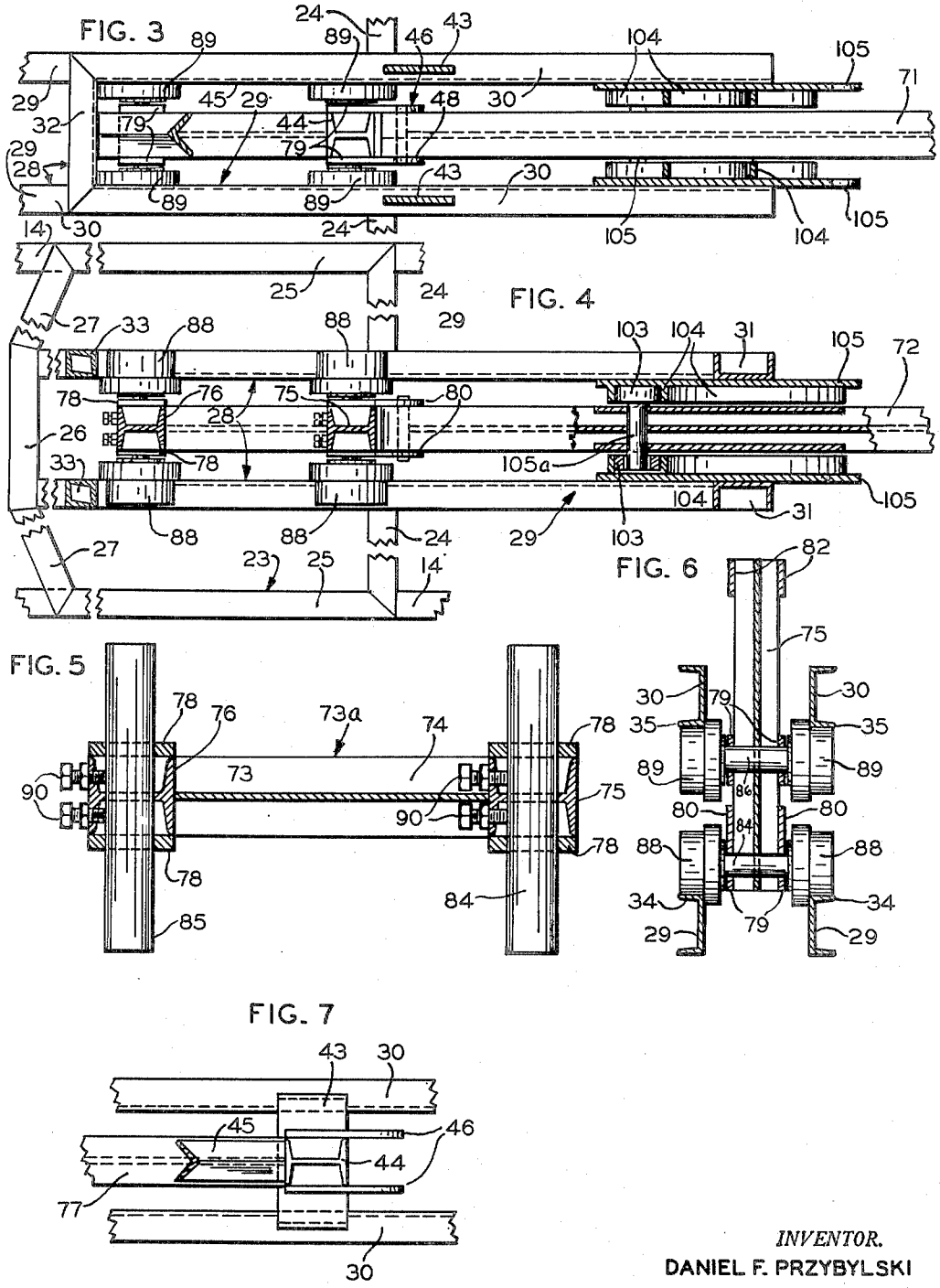

Nov. 13, 1956  D. F. PRZYBYLSKI  2,770,379
BOOM AND BOOM-OPERATING MEANS FOR DIPPER STICK
Filed Oct. 25, 1951  6 Sheets-Sheet 5
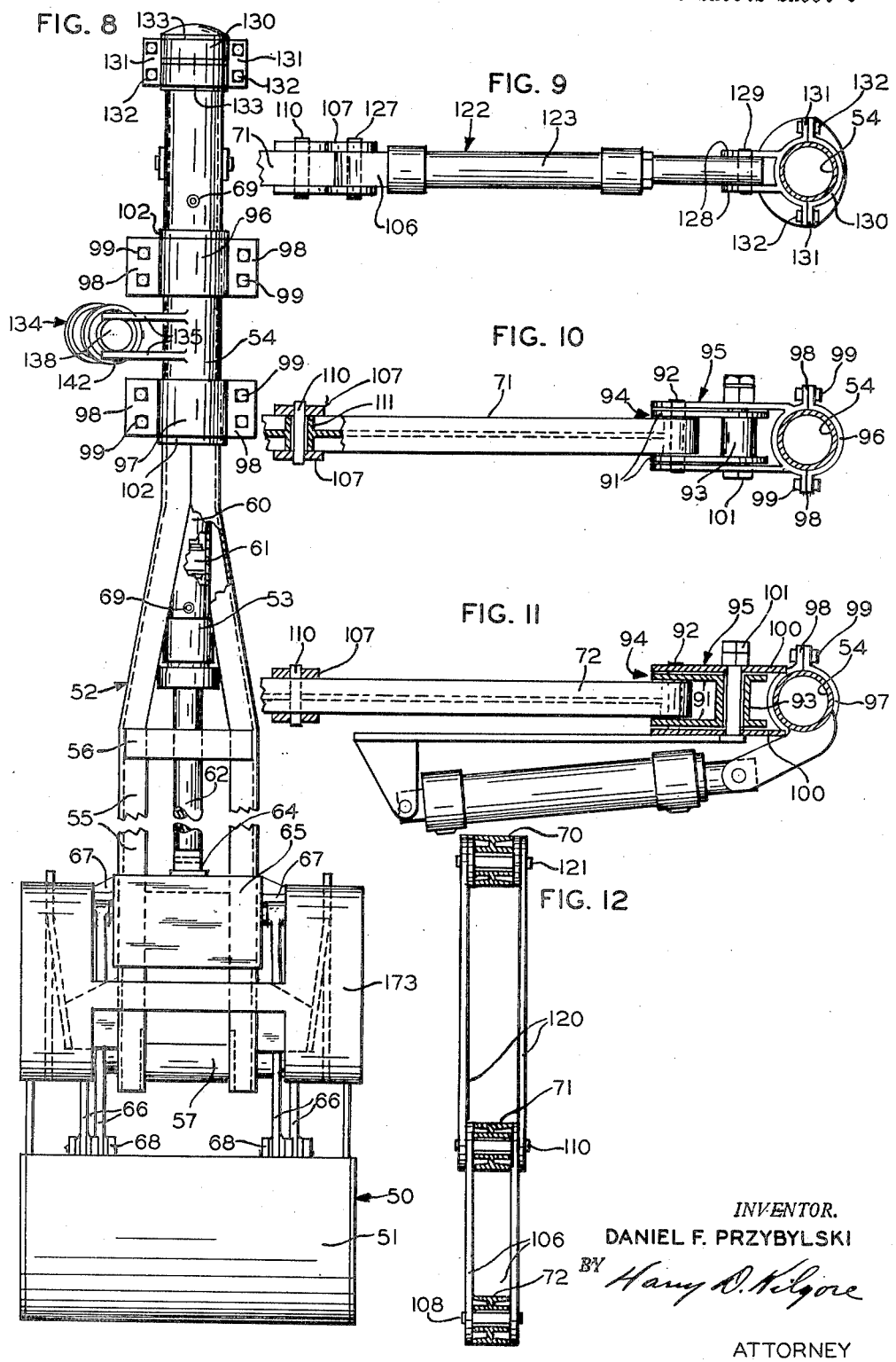
INVENTOR.
DANIEL F. PRZYBYLSKI
BY Harry D. Kilgore
ATTORNEY

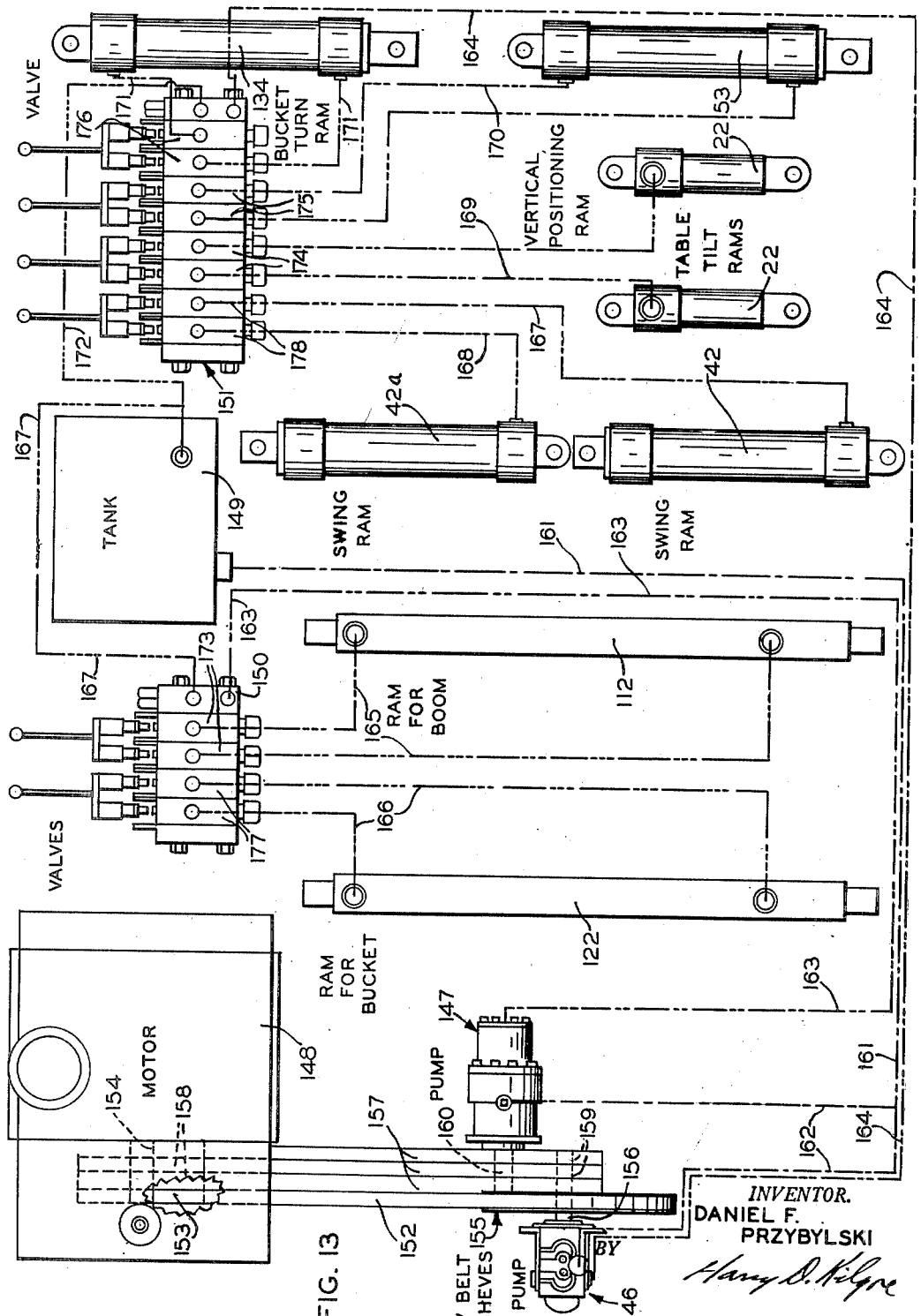

United States Patent Office 2,770,379
Patented Nov. 13, 1956

2,770,379

BOOM AND BOOM-OPERATING MEANS FOR DIPPER STICK

Daniel F. Przybylski, Winona, Minn.

Application October 25, 1951, Serial No. 253,183

12 Claims. (Cl. 214—147)

My present invention relates to trenching machines and has for its object to provide novel booms including mounts and operating means therefor for holding and operating a dipper stick and for opening and closing the jaws of a dipper of the clamshell type carried by the dipper stick.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 1 is a side elevational view of a grave digger embodying the invention;

Figs. 2 and 2ª are side elevational views of the invention, on an enlarged scale;

Figs. 3 and 4 are detail views partly in plan and partly in section taken on the lines 3—3 and 4—4 of Fig. 2, respectively;

Fig. 5 is a detail view partly in plan and partly in section taken on the irregular line 5—5 of Fig. 2, on an enlarged scale;

Fig. 6 is a detail view partly in front elevation and partly in section taken on the line 6—6 of Fig. 2;

Fig. 7 is a fragmentary plan view of the center post and associated parts;

Fig. 8 is a front elevational view of the dipper, outrigger and dipper stick, an intermediate portion of which is broken away;

Figure 1:
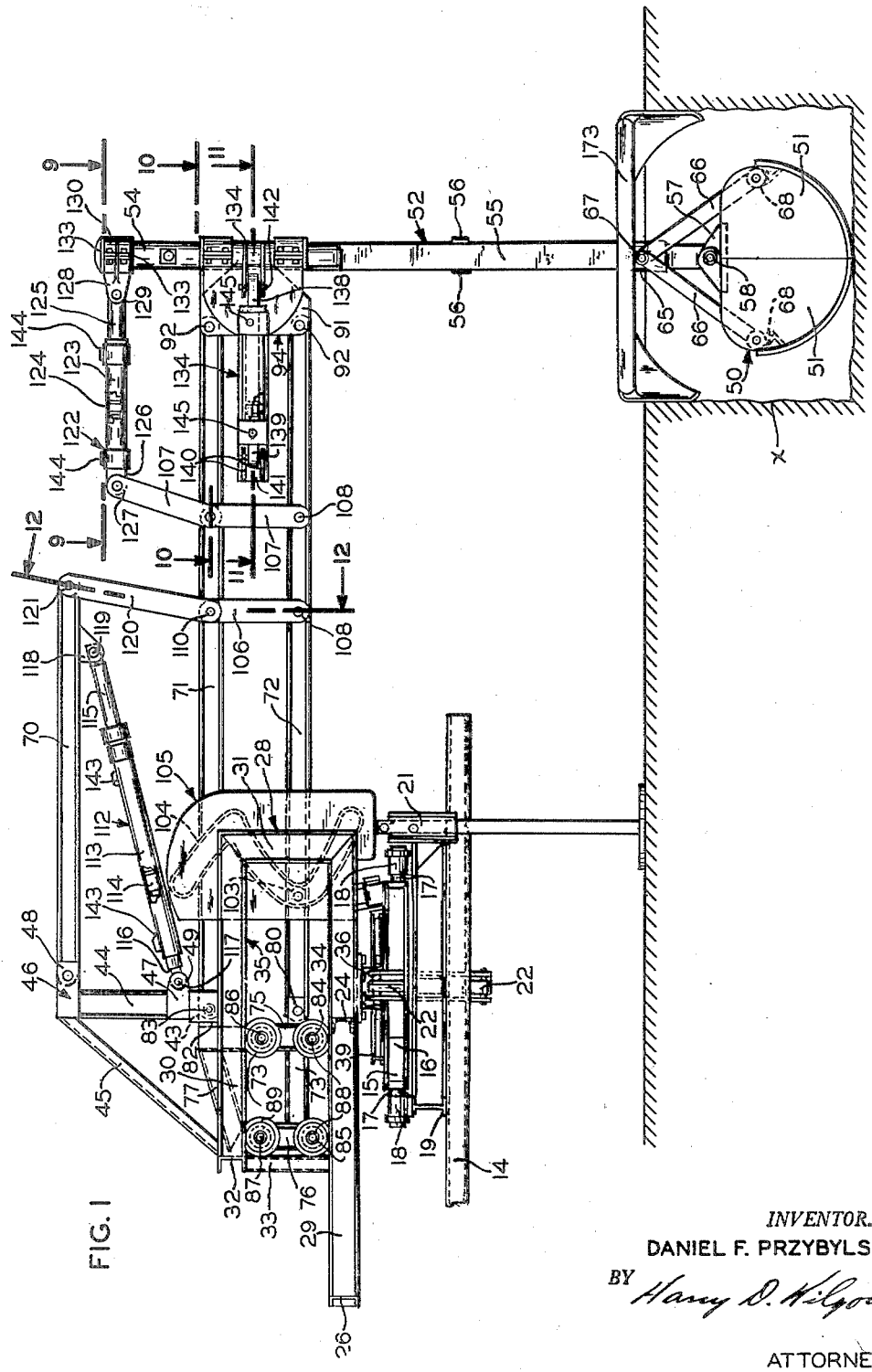

Figs. 9, 10 and 11 are detail views partly in plan and partly in section taken on the lines 9—9, 10—10 and 11—11 of Fig. 1, respectively, on an enlarged scale;

Fig. 12 is a detail view partly in elevation and partly in section taken on the line 12—12 of Fig. 1, on an enlarged scale; and Fig. 13 is a view showing a schematic hydraulic system for operating the several rams.

The numeral 14 indicates the bed of a truck or other transporting means, and the numeral 15 indicates a turntable mounted on a tilting frame 16 provided with a pair of axially aligned trunnions 17. These trunnions 17 extend longitudinally of the bed 14 and are journaled in a pair of bearings 18 bolted, the one to a frame 19, supported by and secured to the bed 14, and the other to a shelf 20 secured to a stabilizer 21. The turntable 15 and its frame 16 are tilted about the axis of the trunnions 17 by a pair of diametrically opposite hydraulic rams 22. These rams 22 afford adjustable connections between the frame 19, which affords a base of reaction, and the turntable frame 16.

A sub-frame 23, formed of channel bars positioned with their webs vertically disposed and with their flanges turned inwardly, rests on the turntable 15 and is secured thereto. This sub-frame 23 includes a front member 24, two side members 25 and a rear member having a central section 26 and forwardly diverging end sections 27. The several members of the sub-frame 23 have intermediate parts thereof broken away and the several sections of said sub-frame drawn together, see Fig. 4.

Formed with the sub-frame 23 is an upper frame 28 comprising two duplicate sections laterally spaced apart at the transverse center of the sub-frame 23. Each section of the upper frame 28 includes a lower longitudinal member 29, an overlying upper longitudinal member 30, and short upright members 31 that connect the members 29 and 30 at their front ends. A short rear horizontal member 32 connects the upper longitudinal members 30 at their rear ends. Posts 33 on the members 29 support the upper member 30 at its rear end and are secured thereto. The lower longitudinal members 29 extend through a gap in the center of the front member 24 with their rear ends abutting the central section 26 of the sub-frame 23 and secured thereto. The lower longitudinal members 29 extend materially forwardly of the sub-frame 23 and the inner ends of the front member 24, at the gap therein abut said members 29 and are secured thereto. The members 29, 30, 31 and 32 of the upper frame 28 are each formed of a channel bar, the webs of which are vertically disposed and the flanges thereof are turned outwardly. The upper flanges of the lower longitudinal members 29 and the lower flanges of the upper member 30 afford tracks 34 and 35, respectively, that extend between the upright members 31 and the posts 33. As shown, each post 33 is formed of two angle bars, the flanges of which are connected.

A swivel 36 connects the two frames 23—28 to the turntable 15 to turn about a vertical axis. Rollers 37, journaled in mounts 38 on the frames 23—28, are arranged to run on the turntable 15 and support said frames therefor. Mounted on the turntable 15 is a large drum 39 concentric with the axis thereof. A cable 40 is intermediately anchored to the drum 39 with its end portions extending around said drum and passed under sheaves 41, only one of which is shown, journaled in mounts 42 on the frame 19. These end portions of the cable 40 are pulled in opposite directions by a pair of hydraulic rams 42a shown only in Fig. 13, to turn the frames 23—28 about the axis of the turntable 15.

A yoke-like base 43 extends transversely between the two upper longitudinal frame members 30, substantially at their transverse centers with their side members resting thereon and secured thereto. A post 44, formed of a heavy I bar, is secured to the base 43 and an oblique brace 45, formed of an angle bar, extends from the upper end of the post 44, at its back to the rear member 32 at its longitudinal center and is secured to said post and member. The post 44 is provided with an upper bearing 46 and a lower bearing 47, each formed of a pair of ears 48 and 49, respectively, one on each side of said post, which project forwardly thereof and are secured to the longitudinal edges of the flanges.

The parts thus far described are more fully shown, described and broadly claimed in an application for a patent entitled "Grave Diggers," executed of even date herewith.

Referring now to a dipper 50 of the clamshell type and having a pair of jaws 51: These jaws 51 are attached to an upstanding dipper stick 52 and are opened and closed by a hydraulic ram 53. The dipper and dipper stick are the subject-matter of an application for patent executed of even date herewith and entitled "Dipper Stick and Dipper Operating Means."

The dipper stick 52 has a cylindrical upper section 54 and a lower section formed of two channel bars 55 with their flanges in opposing relation. The channel bars 55, at their upper end portions, are connected by a pair of side bars 56 and further connected, at their lower end portions, by a tubular member 57. A pair of axially aligned trunnions 58 secured to the webs of the channel bars 55 project outwardly therefrom in substantial axial alignment with the tubular member 57. The dipper jaws 51 are provided with two pairs of overlapping hinge lugs 59 pivoted on the trunnions 58.

The ram 53 extends axially in the dipper stick 52 and comprises a cylinder 60 and a cooperating piston 61 having a piston rod 62. The piston 61 at its outer end is pivoted at 63 to the cylindrical section 54 of the dipper stick 52 and the piston rod 62 is attached at 64 to an elevator 65. This elevator 65 is slidably mounted on the channel bar 55 and connected to the dipper jaws 51 by two pairs of links 66. The links 66 are pivoted, one pair to each end of the elevator 65, as indicated at 67. From the elevator 65, the links 66 of each pair are in downwardly diverging relation and pivoted, at their lower ends, to ears 68 on the dipper jaws 51. On each end portion of the cylinder 60 is a fitting 69 through which fluid is introduced into said cylinder for operating the piston 61.

Referring now in detail to the present invention which forms a part, from a broad viewpoint, of the "Grave Digger" application and the "Dipper Stick and Dipper Operating Means" application heretofore referred to to complete a novel "Grave Digger."

This invention includes a short upper lift boom 70, a long intermediate boom 71 and a long, lower or swing boom 72, all of which are horizontally disposed. The two booms 71 and 72 are pivotally attached at their inner or rear ends to a traveller in the form of a dolly 73 for endwise movement and raising and lowering movement in a vertical plane. This dolly 73 is arranged to travel longitudinally and centrally between the two sections of the upper frame 28.

The dolly body 73a includes a longitudinal member 74 rigidly secured at its ends to a front upright member 75 and a rear upright member 76. The front member 75 projects above the upper longitudinal members 31 and the rear member 32 is shorter than said member 31. A vertically oblique member 77 rigidly connects the body members 75 and 76 and each member 74, 75, 76 and 77 are each an I bar.

A pair of lower bearing plates 78 and a pair of upper bearing plates 79 are secured to the outer edges of the flanges of the front and rear upright body members 75 and 76. Integral with the lower bearings 78, on the front member 75, is a pair of forwardly projecting ears 80 between which the swing boom 72, at its rear end portion, projects and is pivotally secured thereto by a horizontal pin 81. A pair of laterally spaced ears 82 are secured to the outer edges of the flanges of the body front member 75, at the upper end portion thereof. The intermediate boom 71, at its inner end portion, projects between the ears 82 and is attached thereto by a pivot pin 83.

A front axle 84 and a rear axle 85 extend through aligned holes in the lower bearing plates 78 and a front axle 86 and a rear axle 87 extend through aligned holes in the upper bearing plates 79. These axles 84, 85, 86 and 87 also extend through holes in the webs of the body members 75 and 76. A pair of flanged wheels 88 are journaled on the lower axles 84 and 85 and an upper pair of flanged wheels 89 are journaled on the axles 85 and 86. The axles 84, 85, 86 and 87 are held from turning by pairs of set-screws 90 having threaded engagement with certain of the flanges of the front and rear body members 75 and 76. The lower wheels 88 are arranged to run on the lower tracks 34 and the upper wheels 89 are arranged to run loosely on the upper tracks 35. These tracks 34—35 hold the dolly 73 against all movements except for straight-line travel thereon.

The booms 71 and 72 are parallel in a vertical plane and their outer end portions extend between a pair of plates 91 and attached thereto by upper and lower pivot pins 92. These plates 91 are rigidly connected by a hub 93 midway between the pivot pins 92 and inwardly thereof. These plates 91 and hub 93 afford a rocker bearing 94 for the booms 71 and 72 at their outer ends. A mount 95 for the rocker bearing 94 includes an upper sleeve bearing 96 and a lower sleeve bearing 97 axially spaced apart and in which bearings the cylindrical section 54 of the dipper stick 52 is turnably mounted. Each bearing 96—97 is formed of two parts having outturned ears 98 connected by bolts 99. The mount further includes a pair of laterally spaced upright plates 100 integral, at their inner upright edges, with corresponding parts of the two bearings 96—97. The rocker bearing 94 extends between the mount plates 100 and is attached thereto by a pivot bolt 101 that extends through aligned holes in said plates and hub 93. The two bearings 96—97 are held against axial movement on the cylindrical section 54 of the dipper stick 52 by upper and lower annular stop shoulders 102 integral with said cylindrical section 54 between which the bearings 96—97 extend.

The swing boom 72 is guided during raising and lowering movements and when moved endwise with the dolly 73 by a pair of small wheels 103 that travel in a pair of vertically disposed serpentine or zigzag cam-acting channel runways 104. These cam runways 104 are on the opposing faces of a pair of upright laterally spaced plates 105 secured to the upright sections of the upper frame 28 on the inner sides thereof. The wheels 103 are on opposite sides of the boom 72 and journaled on a common pin 105a that extends transversely through the web of the boom 72 and secured thereto. The cam runways 104 are closed at their ends.

The two booms 71 and 72 are connected at their intermediate portions in parallel arrangement by a pair of short inner links 106 and a pair of long outer links 107. The booms 71—72 extend between the links of each pair 106—107 and said links are attached at their lower end portions, to the swing boom 72 by pivots 108 that extend through aligned holes in said links and hubs 109 integral with the web of the swing boom 72. The pair of inner links 106, at their upper end portions, and the outer pair of links 107 at their intermediate portions, are attached to the intermediate boom 71 by pivots 110 that extend through aligned holes in said links and hubs 11 integral with the web of the boom 71. The pivots 108 and 110 are each in the form of headed and nut-equipped bolts.

The lift boom 70 is operated by a hydraulic ram 112 that extends longitudinally thereunder. This ram 112 includes a cylinder 113 and a cooperating piston 114 having a piston rod 115. The cylinder 113 has on its outer end a lug 116 that extends between the lower ears 48 and is attached thereto by a pivot pin 117. From the ears 48, the ram 113 is upwardly inclined to the outer end portion of the boom 70 and its piston rod 115 extends between a pair of depending ears 118 integral with the boom 70 at its outer end portion and attached thereto by a pivot pin 119.

The lift boom 70, at its outer end, is connected to the intermediate boom 71 by a pair of long links 120, the lower end portions of which overlap the upper end portions of the inner pair of links 106 and are connected thereto by its pivot pin 110. The boom 70, at its outer end, projects between the links 120, at their upper ends, and is attached thereto by a pivot pin 121. The dipper stick 52 is positioned and held plumb by a hydraulic ram 122 that includes a cylinder 123 and a cooperating piston 124 having a piston rod 125. The cylinder 123 has on its outer end a lug 126 that extends between the upper end portions of the links 107 and attached thereto by a pivot pin 127. The piston rod 125, at its outer end portion, extends between a pair of ears 128 and attached thereto by a pivot pin 129. These ears 128 are integral with one member of a two-part sleeve bearing 130 in which the cylindrical upper end portion of the dipper stick 52 is turnably mounted. The parts of the bearing 130 have outturned ears 131 connected by bolts 132. The bearing 130 is held against axial movement on the cylindrical section 54 of the dipper stick 52 by a pair of annular shoulders 133 integral with said section. The upper end portions of the links 107 are forwardly inclined and afford a base of resistance for the ram 122.

The dipper stick is turned 90 degrees in the bearings 96, 97 and 130 by means of a hydraulic ram 134 and a pair of laterally spaced crank arms 135 integral with the cylindrical section 54 of the dipper stick 52 between the two bearings 96 and 97. The ram 134 includes a cylinder 136 and a cooperating piston 137 having a piston rod 138. The cylinder 136 has on its outer end a lug 139 that projects between a pair of ears 140 secured to the outer end portion of a long horizontal bar 141 secured at its inner end to one of the side plates 100 of the mount 95. The piston rod 138 extends between the crank arms 135 at their outer end portions and secured thereto by a pivot pin 142. The ram cylinders 113, 122 and 134 each has on each end portion a fitting 143, 144 and 145, respectively. Fluid under pressure is introduced into the ram cylinders 113, 122 and 136 through the fittings 143, 144 and 145, respectively, for operating their pistons. It may be here stated that the bucket jaws 51 are considerably longer than the width thereof; hence, by turning the dipper stick 52 90 degrees by means of the ram 134, a long cut may be made by the dipper 50 either substantially in the plane of the booms 70, 71 and 72 or transversely thereof. Furthermore, by operating the bucket 50 in one position and then turning the same 90 degrees, a square corner may be cut in an excavation.

Fig. 13 is a view in diagram showing a hydraulic system for operating the rams 122, 42a, 53, 112, 122 and 134 and which system includes two pumps 146 and 147, an engine 148 for operating the pumps, an oil tank 149 from which oil is supplied to the pumps 146 and 147, and two units of lever-operated control valves 150 and 151. In actual use, the engine 148 will be mounted on the sub-frame 23.

The pump 146 is driven by the engine 148 by a belt 152 that runs over a small pulley 153 on the engine shaft 154 and a large pulley 155 on the shaft 156 of the pump 146. The pump 147 is driven from the engine 148 by a plurality of belts 157 that run over small pulleys 158 on the engine shaft 154 and large pulleys 159 on the shaft 160 of the pump 147. Oil is supplied to the pumps 146 and 147 through a pipe 161 and branch pipes 162 illustrated thus: ———.———.———.

Oil is conveyed to the unit of control valves 150 and 151 from the pumps 147 and 146, respectively, through pipes 163 and 164 illustrated thus: ———. ———. ———. Oil under pressure is conveyed from the unit of control valves 150 to the ram 112 through two pipes 165 and through two pipes 166 to the ram 122, illustrated thus: ———. . .———. . .———. Excess oil from the unit of control valves 150 is returned to the tank 149 through a pipe 167, illustrated thus: ———. . . .———. . . .———.

Oil is conveyed from the unit of control valves 151 to each of the rams 42a through a pipe 168 and to two rams 22 through pipes 169. Oil is conveyed from the unit of control valves 151 to the ram 53 through two pipes 170 and to the ram 134 through two pipes 171. The pipes 168, 169, 170 and 171 are illustrated thus: ———. . .———. . .———. Excess oil from the unit of control valves 151 is returned to the tank 149 through a pipe 172 illustrated thus: ———. . .———. . .———.

Operation

The purpose of mounting the parallel booms 71 and 72 on the dolly 73 for forward and backward movements controlled by the wheels 103 in the cam runways 104 is to maintain the same horizontal dimension between the center of the turntable 15 and the dipper stick 52 at the rocker bearing 94 for a predetermined number of degrees of elevation or depression of the parallel boom 71—72 when actuated by the lift ram 70.

By operating the control valve 173, see Fig. 13, the ram 112 will be actuated to raise the lift boom 70 and by operating said control valve, the lift boom 70 will be lowered. Raising and lowering the lift boom 70 will impart like movements to the parallel booms 71 and 72 through the linkage 106—120. As the booms 71—72 are being raised or lowered, they will move the dolly 73 on the tracks 34—35 and cause the wheels 103 to roll in the cam runways 104. Horizontal movement of the cam runways 104 impart like movement to the dolly 73. This control of the endwise movement of the booms 71—72 by the wheels 103 and cam runways 104 will compensate for the up and down movements of the dipper stick 52, while the heretofore mentioned horizontal dimension is maintained. This equalizing movement continues until the wheels 103 reach the most forward travel in the cam runway 104 both above and below a horizontal position of the booms 71—72. When the wheels 103 reach their uppermost forward position during the raising of the boom 71—72, the wheels 103 start to move rearward in the cam runway 104 during the continued raising of said boom. During rearward movement of the wheels 103, the dolly 73 is being moved rearwardly. The cam runway 104 and the wheels 103 are designed to keep the dipper stick 52 at the rocker bearing 94 in a vertical line to the ground level for a predetermined height and depth.

The following is a brief description of the necessary steps required to set up the grave digger and complete one digging cycle:

Necessary set-up steps are as follows:

1. After the truck or other conveyance has positioned the digger thereon for a given digging operation, the turntable 15 is first leveled by manipulating the control valve 174 to actuate the rams 22.

2. Next, the dipper stick 52 is positioned vertically by manipulating the control valve 175 to actuate the ram 53.

3. The dipper 50 is positioned to cut in substantially the plane of the booms 70, 71 and 72 or to cut transversely of said plane by manipulating the control valve 176 to actuate the ram 134.

A digging cycle is as follows:

First, the booms 70, 71, 72 and dipper stick 52 and dipper 50, with its jaws 51 open, are lowered by manipulating the control valve 175 to actuate the ram 112. The dipper 50 is closed to make a cut by manipulating the control valve 177 to actuate the ram 53.

When the dipper 50 is fully closed, the ram 112 is actuated by manipulating the control valve 173 to raise the booms 70, 71 and 72, the dipper stick 52 and dipper 50 to the desired height. The raised booms 70, 71 and 72, dipper stick 52 and dipper 50 are swung to one side where the dirt in dipper 50 is to be deposited by manipulating the control valve 178 to actuate the rams 42a. To open the dipper 50 and release the dirt therein, the control valve 177 is manipulated to actuate ram 122. After the dirt has been released, the control valve 178 is manipulated to actuate the ram 42a and return the dipper 50 to the digging area.

This completes one digging cycle and the above operations can now be repeated to again fill the dipper 50.

The drawings illustrate a commercial form of the invention, but it will be understood that the same is capable of certain modifications as to details of construction, arrangement and combination of parts within the scope of the invention herein disclosed.

Copending with this application are the two applications identified as follows:

Grave Digger filed October 25, 1951, under Serial No. 253,181, with claims to a bed, a frame tiltable on the bed, a turntable fixed to the frame, rams for tilting the frame and turntable, a second frame turntable on the turntable and rams for turning the last-noted frame, and Dipper Stick and Dipper Operating Means, filed October 25, 1951, under Serial No. 253,182, and now Patent No. 2,689,661, with claims to dipper stick, means for attaching a dipper to said stick and means for operating the dipper.

What I claim is:

1. A portable bed, a frame structure mounted on the bed and having upper and lower track rails, a dipper having an upstanding dipper stick, a dolly having front and rear upper and lower wheels arranged to run on the track rails, an upper bearing and an intermediate mount in which the dipper stick is mounted to turn about its longitudinal axis, a rocker bearing pivoted to the mount to turn about a horizontal axis, two substantially parallel booms pivoted at their inner ends to the dolly and pivoted at their outer ends to the rocker bearing, an inner link and an outer link pivoted to the booms at their intermediate portions and connecting the same, said outer link extending above the uppermost of said booms, a third boom overlying the first-noted booms, and pivoted at its inner end to the frame structure, a pivoted link connecting the third boom at its outer end portion to the uppermost of the first noted booms, means for operating the third boom, and a connection between the bearing on the dipper stick and the upper end portion of the outer link for moving the dipper stick about the axis of the rocker bearing.

2. A frame mounted to turn about a vertical axis and having a trackway, a dolly arranged to travel on the trackway, a lower boom pivoted at its inner end to the dolly, a post mounted on the frame, an upper boom pivoted at its inner end to the post, a rocker bearing connecting the booms at their outer ends, an upstanding lever intermediately pivoted to the upper boom and pivoted at its lower end to the lower boom, a dipper-equipped dipper stick intermediately pivoted to the rocker bearing, means for raising and lowering the booms, a hydraulic ram pivotally connecting the dipper stick at its upper end to the upper end of the lever and comprising a cylinder and a cooperating piston having a piston rod, and means for imparting predetermined endwise reciprocating movement to the lower boom during the raising and lowering of the booms.

3. A frame mounted to turn about a vertical axis and having a trackway, a dolly arranged to travel on the trackway, a lower boom pivoted at its inner end to the dolly, a post mounted on the frame, an intermediate boom and an upper boom pivoted at their inner ends to the post, a rocker bearing connecting the lower and intermediate booms at their outer ends, a pivoted link connecting the upper boom at its outer end to the intermediate boom, a hydraulic ram pivotally connecting the upper boom to the posts and comprising a cylinder and a cooperating piston having a piston rod for raising and lowering the booms, a dipper-equipped dipper stick intermediately pivoted to the rocker bearing, an upstanding lever intermediately pivoted to the intermediate boom and pivoted at its lower end to the lower boom, a hydraulic ram pivotally connecting the dipper stick at its upper end to the upper end of the lever and comprising a cylinder and a cooperating piston having a piston rod, and means for imparting predetermined endwise reciprocating movement to the lower boom during the raising and lowering of the booms.

4. A portable bed, a frame structure mounted on the bed and having a trackway, a dipper having an upstanding dipper stick, a dolly arranged to travel on the trackway, a mount secured to the dipper stick, a rocker bearing pivoted to the mount to turn about a horizontal axis, two booms spaced, the one above the other and pivoted at their inner ends to the dolly and pivoted at their outer ends to the rocker bearing, means for raising and lowering the booms, means on the frame structure and one of the booms for controlling the travel of the dolly, means for raising and lowering the booms including a third boom overlying the first-noted booms and pivoted at its inner end to the frame structure, linkage connecting the third boom at its outer end to the first noted booms, and a hydraulic ram for operating the third boom, said ram comprising a cylinder and a cooperating piston having a piston rod, said cylinder being attached at its inner end to the frame structure below the third boom and said piston rod being attached to the third boom at its outer end portion, and means for introducing fluid under pressure into the cylinder for operating the piston.

5. A frame, a traveller mounted on the frame and held for straight line reciprocation, a boom pivoted to the traveller, means for raising or lowering the boom, a fixed vertically disposed guide, and means attached to the boom and held by the guide for relative movement, said guide being constructed and arranged to direct the means on the boom during raising or lowering of the boom and thereby imparting endwise reciprocation to the boom and to the traveller.

6. The structure defined in claim 5 in which the guide includes sections spaced the one above the other.

7. The structure defined in claim 5 in which the guide includes sections of substantially the same length spaced the one above the other.

8. The structure defined in claim 5 in which the guide includes sections spaced the one above the other and alternately and reversely inclined in a vertical plane.

9. The structure defined in claim 5 further including a pair of upright laterally spaced plates fixed relative to the frame, and in which structure the guide includes two opposing channels secured to the plates on their inner sides and between which channels the boom extends, each channel comprising sections spaced the one above the other, and alternately reversely inclined, the means attached to the boom being two wheels journaled one on each side of the boom and extending into the channels.

10. A bed, a frame mounted on the bed to turn about a vertical axis, a traveller mounted on the frame for straight line reciprocation, a boom structure pivoted at its inner end to the traveller, means for raising or lowering the boom structure, a fixed vertically disposed guide, means attached to the boom structure and held by the guide for relative movement, said guide being constructed and arranged to direct the means on the boom structure during raising or lowering of the boom structure and thereby impart endwise reciprocation to the boom structure and to the traveller, a rocker bearing pivoted to the outer end of the boom structure to swing in the plane thereof, a vertically disposed dipper equipped dipper stick intermediately mounted in the rocker bearing to turn about its longitudinal axis, means for swinging the dipper stick and the rocker bearing in the plane of the boom structure, and other means for turning the dipper stick in the rocker bearing.

11. The structure defined in claim 10 in which the means for turning the dipper stick in the rocker bearing comprises a hydraulic ram including a cylinder and a cooperating piston having a piston rod, means holding the cylinder fixed to the boom structure, and crank means fixed to the dipper stick to which the piston rod is pivoted.

12. The structure defined in claim 10 in which the means for swinging the dipper stick and the rocker bearing comprises a hydraulic ram including a cylinder and a cooperating piston having a piston rod, means fixed to the boom structure to which the cylinder is pivoted, and a bearing in which the dipper stick at its upper end portion is turnably mounted and to which bearing the piston rod is pivoted.

References Cited in the file of this patent

UNITED STATES PATENTS

| | | |
|---|---|---|
| 1,260,683 | Keast | Mar. 26, 1918 |
| 2,220,267 | Nelson | Nov. 5, 1940 |
| 2,397,271 | Ladwig | Mar. 26, 1946 |
| 2,471,364 | Weber | May 24, 1949 |
| 2,484,709 | Heath | Oct. 11, 1949 |
| 2,486,479 | Kennedy | Nov. 1, 1949 |
| 2,538,505 | Carter | Jan. 16, 1951 |
| 2,541,045 | Ferwerda | Feb. 13, 1951 |
| 2,547,596 | Praytor | Apr. 3, 1951 |
| 2,651,424 | Johnson | Sept. 8, 1953 |